(12) United States Patent
Greenhill et al.

(10) Patent No.: US 12,064,948 B2
(45) Date of Patent: Aug. 20, 2024

(54) GRADIENT NANOPARTICLE-CARBON ALLOTROPE-POLYMER COMPOSITE MATERIAL

(71) Applicant: Greenhill AntiBallistics Corporation, Davidson, NC (US)

(72) Inventors: Zachary R. Greenhill, Huntersville, NC (US); Joseph J. Belbruno, Hanover, NH (US)

(73) Assignee: Greenhill Antiballistics Corporation, Davidson, NC (US)

( * ) Notice: Subject to any disclaimer, the term of this patent is extended or adjusted under 35 U.S.C. 154(b) by 331 days.

(21) Appl. No.: 17/180,515

(22) Filed: Feb. 19, 2021

(65) Prior Publication Data

US 2021/0197518 A1 Jul. 1, 2021

Related U.S. Application Data

(63) Continuation of application No. 13/880,270, filed as application No. PCT/US2011/056696 on Oct. 18, 2011, now Pat. No. 10,926,513.

(Continued)

(51) Int. Cl.
*B32B 9/00* (2006.01)
*B32B 5/16* (2006.01)
(Continued)

(52) U.S. Cl.
CPC ............. *B32B 5/16* (2013.01); *B32B 5/30* (2013.01); *B32B 9/007* (2013.01); *B32B 9/048* (2013.01);
(Continued)

(58) Field of Classification Search
CPC ....... Y10T 428/30; B82Y 30/00; B82Y 40/00; H01B 1/04; Y10S 977/742
(Continued)

(56) References Cited

U.S. PATENT DOCUMENTS 2,978,584 A 4/1961 Loconti et al.
3,485,658 A 12/1969 Lier
(Continued)

FOREIGN PATENT DOCUMENTS

DE 3404272 10/1987
DE 3404272 A1 10/1987
(Continued)

OTHER PUBLICATIONS

In the U.S. Patent and Trademark Office, Office Action in re: U.S. Appl. No. 14/039,088, dated May 19, 2014, 33 pages.
(Continued)

*Primary Examiner* — Daniel H Miller
(74) *Attorney, Agent, or Firm* — Elevated IP, LLC

(57) ABSTRACT

A shock wave attenuating material (100) includes a substrate layer (104). A plurality (110) of shock attenuating layers is disposed on the substrate layer (104). Each of the plurality (110) of shock attenuating layers includes a gradient nanoparticle layer (114) including a plurality of nanoparticles (120) of different diameters that are arranged in a gradient from smallest diameter to largest diameter and a graphitic layer (118) disposed adjacent to the gradient nanoparticle layer. The graphitic layer (118) includes a plurality of carbon allotrope members (128) suspended in a matrix (124).

20 Claims, 3 Drawing Sheets

Related U.S. Application Data

(60) Provisional application No. 61/477,674, filed on Apr. 21, 2011, provisional application No. 61/411,494, filed on Nov. 9, 2010, provisional application No. 61/394,066, filed on Oct. 18, 2010.

(51) Int. Cl.
| | | |
|---|---|---|
| *B32B 5/30* | (2006.01) | |
| *B32B 9/04* | (2006.01) | |
| *B32B 27/14* | (2006.01) | |
| *B32B 27/36* | (2006.01) | |
| *C09D 1/00* | (2006.01) | |
| *F16F 7/00* | (2006.01) | |
| *F41H 1/02* | (2006.01) | |
| *F41H 1/04* | (2006.01) | |
| *F41H 1/08* | (2006.01) | |
| *F41H 5/04* | (2006.01) | |
| *F41H 7/04* | (2006.01) | |
| *F42D 5/045* | (2006.01) | |
| *B82Y 30/00* | (2011.01) | |

(52) U.S. Cl.
CPC ............ *B32B 27/14* (2013.01); *B32B 27/365* (2013.01); *C09D 1/00* (2013.01); *F16F 7/00* (2013.01); *F41H 1/02* (2013.01); *F41H 1/04* (2013.01); *F41H 1/08* (2013.01); *F41H 5/04* (2013.01); *F41H 7/04* (2013.01); *F42D 5/045* (2013.01); *B32B 2264/0235* (2013.01); *B32B 2264/102* (2013.01); *B32B 2264/108* (2013.01); *B32B 2307/558* (2013.01); *B32B 2437/04* (2013.01); *B32B 2571/02* (2013.01); *B32B 2605/00* (2013.01); *B82Y 30/00* (2013.01); *Y10T 428/13* (2015.01); *Y10T 428/25* (2015.01); *Y10T 428/256* (2015.01); *Y10T 428/30* (2015.01)

(58) Field of Classification Search
USPC .......................................................... 428/408
See application file for complete search history.

(56) References Cited

U.S. PATENT DOCUMENTS

| | | | |
|---|---|---|---|
| 4,014,926 A | 3/1977 | Dear et al. | |
| 4,090,967 A | 5/1978 | Falk | |
| 4,179,979 A | 12/1979 | Cook et al. | |
| 4,186,648 A | 2/1980 | Clausen et al. | |
| 4,585,685 A | 4/1986 | Forry et al. | |
| 4,719,151 A | 1/1988 | Chyung | |
| 5,540,951 A | 7/1996 | Nahayama et al. | |
| 5,635,288 A | 6/1997 | Park | |
| 5,747,152 A | 5/1998 | Oka et al. | |
| 5,762,841 A | 6/1998 | Shimai et al. | |
| 5,834,101 A | 11/1998 | Hayashi | |
| 5,942,015 A | 8/1999 | Culler et al. | |
| 6,028,020 A | 2/2000 | Tanaka et al. | |
| 6,225,246 B1 | 5/2001 | Darcovich | |
| 6,537,654 B1 | 3/2003 | Gruber et al. | |
| 6,832,735 B2 | 12/2004 | Yadav et al. | |
| 7,002,754 B2 | 2/2006 | Baer et al. | |
| 7,268,364 B2 | 9/2007 | Aculon | |
| 7,471,503 B2 | 12/2008 | Aculon et al. | |
| 7,549,366 B2 | 6/2009 | Park et al. | |
| 7,625,149 B2 | 12/2009 | Aculon | |
| 7,685,922 B1 | 3/2010 | Martin | |
| 7,691,478 B2 | 4/2010 | Aculon | |
| 7,740,940 B2 | 6/2010 | Aculon | |
| 7,832,023 B2 | 11/2010 | Crisco | |
| 7,879,437 B2 | 2/2011 | Aculon | |
| 7,901,777 B2 | 3/2011 | Aculon | |
| 7,989,069 B2 | 8/2011 | Aculon | |
| 8,025,974 B2 | 9/2011 | Aculon | |
| 8,048,487 B2 | 11/2011 | Aculon | |
| 8,053,081 B2 | 11/2011 | Aculon | |
| 8,067,103 B2 | 11/2011 | Aculon | |
| 8,178,004 B2 | 5/2012 | Aculon | |
| 8,236,426 B2 | 8/2012 | Aculon | |
| 9,060,560 B2 | 6/2015 | Greenhill et al. | |
| 9,328,788 B2 | 5/2016 | Greenhill et al. | |
| 9,982,736 B2 | 5/2018 | Greenhill et al. | |
| 10,926,513 B2 | 2/2021 | Greenhill et al. | |
| 10,954,167 B1 | 3/2021 | Garnier et al. | |
| 2002/0118435 A1 | 8/2002 | Foulger et al. | |
| 2003/0031438 A1 | 2/2003 | Kambe et al. | |
| 2003/0044543 A1 | 3/2003 | Okamoto | |
| 2003/0122111 A1 | 7/2003 | Glatkowski | |
| 2004/0007702 A1 | 1/2004 | Avniel et al. | |
| 2004/0038007 A1 | 2/2004 | Kotov et al. | |
| 2004/0071422 A1 | 4/2004 | Aylward et al. | |
| 2004/0200347 A1* | 10/2004 | Grosch | F41H 7/02 89/902 |
| 2004/0247808 A1 | 12/2004 | Cooper et al. | |
| 2005/0066805 A1 | 3/2005 | Park et al. | |
| 2005/0158551 A1 | 7/2005 | Rhoads et al. | |
| 2005/0159001 A1 | 7/2005 | Kim et al. | |
| 2005/0189014 A1 | 9/2005 | Gaudiana et al. | |
| 2006/0011054 A1 | 1/2006 | Walthall et al. | |
| 2006/0286883 A1 | 12/2006 | Brown et al. | |
| 2007/0003753 A1 | 1/2007 | Asaari | |
| 2007/0220662 A1 | 9/2007 | Pierce | |
| 2007/0293107 A1 | 12/2007 | Follo et al. | |
| 2007/0295242 A1 | 12/2007 | Shim et al. | |
| 2008/0108122 A1 | 5/2008 | Paul et al. | |
| 2008/0131709 A1 | 6/2008 | Hanson et al. | |
| 2008/0286559 A1 | 11/2008 | Lee et al. | |
| 2009/0087644 A1 | 4/2009 | Supriya et al. | |
| 2009/0130425 A1 | 5/2009 | Whitaker | |
| 2009/0217812 A1 | 9/2009 | Whitaker et al. | |
| 2009/0314350 A1 | 12/2009 | Jung et al. | |
| 2009/0324910 A1 | 12/2009 | Gemici et al. | |
| 2010/0012004 A1 | 1/2010 | Telander | |
| 2010/0178512 A1 | 7/2010 | Giesenberq et al. | |
| 2010/0215985 A1 | 8/2010 | Kitano | |
| 2011/0091729 A1 | 4/2011 | Hanson | |
| 2011/0168003 A1 | 7/2011 | Kim | |
| 2011/0192274 A1 | 8/2011 | Fingerhut | |
| 2011/0195246 A1 | 8/2011 | Hanson et al. | |
| 2011/0198113 A1 | 8/2011 | Hanson | |
| 2011/0212320 A1 | 9/2011 | Greenhill et al. | |
| 2011/0314997 A1 | 12/2011 | Carberry et al. | |
| 2012/0003481 A1 | 1/2012 | Hanson | |
| 2012/0004388 A1 | 1/2012 | Hanson | |
| 2012/0088036 A1 | 4/2012 | Greenhill et al. | |
| 2012/0291620 A1 | 11/2012 | Yeshurun | |
| 2013/0006205 A1 | 1/2013 | McKiernan et al. | |
| 2013/0126146 A1 | 5/2013 | Chiang | |
| 2013/0273273 A1 | 10/2013 | Greenhill et al. | |
| 2014/0023805 A1 | 1/2014 | Greenhill et al. | |
| 2014/0099472 A1 | 4/2014 | Greenhill et al. | |
| 2014/0113086 A1 | 4/2014 | Greenhill et al. | |
| 2015/0194713 A1 | 7/2015 | Jin et al. | |
| 2015/0237929 A1 | 8/2015 | Greenhill et al. | |
| 2016/0071655 A1 | 3/2016 | Li et al. | |
| 2016/0159033 A1 | 6/2016 | Greenhill et al. | |
| 2019/0115278 A1 | 4/2019 | Greenhill | |
| 2019/0128357 A1 | 5/2019 | Greenhill et al. | |
| 2021/0115211 A1 | 4/2021 | Allain et al. | |
| 2021/0269366 A1 | 9/2021 | Garnier et al. | |

FOREIGN PATENT DOCUMENTS

| | | |
|---|---|---|
| DE | 3936991 | 10/1990 |
| DE | 3936991 C1 | 10/1990 |
| DE | 10107340 | 8/2002 |
| DE | 10107340 A1 | 8/2002 |
| DE | 10305405 | 8/2004 |
| DE | 10305405 A1 | 8/2004 |
| GB | 2365750 | 2/2002 |
| GB | 2365750 A | 2/2002 |
| JP | 2001129906 | 5/2001 |

(56) References Cited

FOREIGN PATENT DOCUMENTS

| | | | |
|---|---|---|---|
| JP | 2001129906 A | 5/2001 |
| JP | 2001-192275 | 7/2001 |
| JP | 2001192275 A | 7/2001 |
| JP | 03-224577 | 10/2001 |
| JP | 3224577 B2 | 10/2001 |
| JP | 2008-169935 | 7/2008 |
| JP | 2008169935 A | 7/2008 |
| JP | 2015-052095 | 3/2015 |
| JP | 2015052095 A | 3/2015 |
| WO | 2003/025493 | 3/2003 |
| WO | 2003025493 A1 | 3/2003 |
| WO | 2008/054867 | 5/2008 |
| WO | 2008054867 A2 | 5/2008 |
| WO | 2009/058453 | 5/2009 |
| WO | 2009058453 A2 | 5/2009 |
| WO | 2009/143405 | 11/2009 |
| WO | 2009143405 A2 | 11/2009 |
| WO | 2010/019609 | 2/2010 |
| WO | 2010/019612 | 2/2010 |
| WO | 2010019609 A1 | 2/2010 |
| WO | 2010019612 A2 | 2/2010 |
| WO | 2012/054472 | 4/2012 |
| WO | 2012054472 A2 | 4/2012 |
| WO | 2014/008031 | 1/2014 |
| WO | 2014008031 A1 | 1/2014 |
| WO | 2014/197082 | 12/2014 |
| WO | 2014197082 A2 | 12/2014 |
| WO | 2017/177040 | 10/2017 |
| WO | 2017177040 A1 | 10/2017 |

OTHER PUBLICATIONS

In the U.S. Patent and Trademark Office, Final Office Action in re: U.S. Appl. No. 12/672,865, dated Jun. 18, 2014, 29 pages.
In the U.S. Patent and Trademark Office, Office Action in re: U.S. Appl. No. 12/672,865, dated Nov. 5, 2014, 68 pages.
In the U.S. Patent and Trademark Office, Applicant Initiated Interview Summary in re: U.S. Appl. No. 12/672,865, dated Oct. 1, 2014, 5 pages.
In the U.S. Patent and Trademark Office, Applicant Initiated Interview Summary in re: U.S. Appl. No. 12/672,865, dated Apr. 8, 2014, 4 pages.
In the U.S. Patent and Trademark Office, Examiner Initiated Interview Summary in re: U.S. Appl. No. 12/672,865, dated Apr. 8, 2014, 1 pages.
In the U.S. Patent and Trademark Office, Final Office Action in re: U.S. Appl. No. 14/035,531, dated Jul. 9, 2014, 9 pages.
In the U.S. Patent and Trademark Office, Applicant Initiated Interview Summary in re: U.S. Appl. No. 14/035,531, dated Aug. 4, 2014, 3 pages.
In the U.S. Patent and Trademark Office, Examiner Initiated Interview Summary in re: U.S. Appl. No. 14/035,531, dated Oct. 8, 2014, 2 pages.
In the U.S. Patent and Trademark Office, Final Office Action in re: U.S. Appl. No. 12/672,865, dated Sep. 27, 2012, 17 pages.
Pages. the U.S. Patent and Trademark Office, Office Action in re: U.S. Appl. No. 12/672,865, dated Mar. 23, 2012, 11 pages.
49* In the U.S. Patent and Trademark Office, Office Action in re: U.S. Appl. No. 12/672,865, dated Mar. 23, 2012, 11 pages.
International Search Report in related International Application No. PCT/US2011/056696, dated May 8, 2012.
Institute of Materials Research and Engineering Media Release, "Body armour and protective sports padding made from cornstarch solution?" Jul. 28, 2010, 4 pages.
International Search Report for related International Application No. PCT/US2008/072808, dated Sep. 17, 2009.
International Search Report for related International Application No. PCT/US2009/053462, dated Oct. 19, 2009.
International Search Report for related International Application No. PCT/US2009/053465, dated Jul. 26, 2010.
U.S. Environmental Protection Agency, "Colorimetric Screening Procedure for ROX and HMX in Soil," EPA Method 8510 [online], Revision 0, Feb. 2007 [retrieved on Jul. 24, 2012]. Retrieved from the Internet: <URL: http://www.caslab.com/EPA- Methods/PDF/EPA-Method-8510.pdf>.
Zhang et al., "Self Cleaning Particle Coating with Antireflection Properties," Chem. Mater., 2005, 17, pp. 696-700.
U.S. Appl. No. 13/839,777, in the U.S. Patent and Trademark Office, Final Office Action dated Jun. 4, 2018.
U.S. Appl. No. 13/839,777, in the U.S. Patent and Trademark Office, Office Action dated Mar. 28, 2019.
U.S. Appl. No. 13/880,270, in the U.S. Patent and Trademark Office, Office Action dated Jan. 2, 2020.
U.S. Appl. No. 14/720,374, in the U.S. Patent and Trademark Office, Final Office Action dated Jun. 7, 2018.
U.S. Appl. No. 14/720,374, in the U.S. Patent and Trademark Office, Office Action dated Feb. 4, 2019.
U.S. Appl. No. 15/992,022, in the U.S. Patent and Trademark Office, Office Action dated Jun. 28, 2019.
Bertoldi et al., "Mechanically triggered transformations of phononic band gaps in periodic elastomeric structures," Physical Review B, 2008; 77: 052105.
Bertoldi et al., "Mechanics of deformation-triggered pattern transformations and superelastic behavior in periodic elastomeric structures," Journal of the Mechanics and Physics of Solids, 2008; 56: pp. 2642-2668.
Bertoldi et al., "Wave propagation and instabilities in monolithic and periodically structured elastomeric materials underqoinq large deformations," Physical Review B, 2008; 78: 184017.
Kinge et al., "Self-Assembling Nanoparticles at Surfaces and Interfaces," ChemPhysChem, 2008; 9: pp. 20-42.
Shevchenko et al., "Structural Characterization of Self-Assembled Multifunctional Binary Nanoparticle Superlattices," Am. J. Chem. Soc., 2006; 128: pp. 3620-3637.
Shevchenko et al., "Structural diversity in binary nanoparticle superlattices," Nature, 2006; 439(5): pp. 55-59.
Sigalas et al., "Classical vibrational modes in phononic lattices: theory and experiment," Z. Kristallogr., 2005; 220: pp. 765-809.
Sunkara et al., "Solidification of Colloidal Crystals of Silica," Hybrid Organic-Inorganic Composites, 1995; Chapter 14, ACS Symposium Series: pp. 181-191.
Wang et al., "Self-Assembly of Two- and Three-Dimensional Particle Arrays by Manipulating the Hydrophobicity of Silica Nanospheres," J. Phys. Chem. B., 2005; 109: pp. 22175-22180.
U.S. Appl. No. 13/839,777, in the U.S. Patent and Trademark Office, Office Action dated Aug. 8, 2017.
U.S. Appl. No. 14/039,088, in the U.S. Patent and Trademark Office, Patent Board Decision—Examiner Affirmed dated Aug. 2, 2017.
U.S. Appl. No. 14/720,374, in the U.S. Patent and Trademark Office, Office Action dated Aug. 24, 2017.
Advanced Industrial, "Ultra High Temperature Materials," Mar. 2016, [online] [retrieved on Jun. 12, 2017]. Retrieved from the Internet: <URL: https://web.archive.org/web/20160329142934/http://www.cncplastics.com/ultrahightemp.php>.
International Search Report and Written Opinion for related International Application No. PCT/US2017/026407, dated Jun. 28, 2017.
Leeman et al., "Varve formation and the climatice record in an Alpine proglacial lake: calibrating annually-laminated sediments against hydrological and meteorological data," The Holocene, 1994, 4:1, pp. 1-8.
Weinlick, "Additive Roll-to-Roll Manufacturing Techniques Being Developed," Mar. 2015, [online] [retrieved on Jun. 12, 2017]. Retrieved from the Internet: <URL: https://www.beyond.com/articles/additive-roll-to-roll-manufacturing-techniques-being- developed-16933-article.html>.
U.S. Appl. No. 13/839,777, in the U.S. Patent and Trademark Office, Final Office Action dated Oct. 17, 2016, 11 pages.
U.S. Appl. No. 13/839,777, in the U.S. Patent and Trademark Office, Office Action dated Feb. 11, 2016, 14 pages.
In the U.S. Patent and Trademark Office, Examiner's Answer to Appeal Brief in re: U.S. Appl. No. 14/039,088, dated Jun. 30, 2016, 35 pages.

(56) References Cited

OTHER PUBLICATIONS

In the U.S. Patent and Trademark Office, Notice of Allowance in re: U.S. Appl. No. 14/035,531, dated Mar. 22, 2016, 8 pages.
In the U.S. Patent and Trademark Office, Final Office Action in re: U.S. Appl. No. 14/035,531, dated Nov. 19, 2015, 13 pages.
In the U.S. Patent and Trademark Office, Final Office Action in re: U.S. Appl. No. 14/039,088, dated Feb. 4, 2015, 38 pages.
In the U.S. Patent and Trademark Office, Notice of Allowance in re: U.S. Appl. No. 12/672,865, dated May 7, 2015, 10 pages.
In the U.S. Patent and Trademark Office, Office Action in re: U.S. Appl. No. 13/841,655, dated Nov. 27, 2015, 22 pages.
In the U.S. Patent and Trademark Office, Office Action in re: U.S. Appl. No. 14/035,531, dated Feb. 24, 2015, 12 pages.
In the U.S. Patent and Trademark Office, Office Action in re: U.S. Appl. No. 14/039,088, dated Oct. 13, 2015, 32 pages.
In the U.S. Patent and Trademark Office, Requirement for Restriction/Election in re: U.S. Appl. No. 13/839,777, dated Sep. 11, 2015, 8 pages.
In the U.S. Patent and Trademark Office, Requirement for Restriction/Election in re: U.S. Appl. No. 13/841,655, dated Jul. 2, 2015, 8 pages.
International Search Report for related International Application No. PCT/US2013/047515, dated Nov. 22, 2013.
Supplementary European Search Report for related European Application No. EP 11834986, dated May 2, 2014.
International Search Report for related International Application No. PCT/US14/27822, dated Jan. 27, 2015.
In the U.S. Patent and Trademark Office, Applicant Initiated Interview Summary in re: U.S. Appl. No. 12/672,865, dated Apr. 2, 2014, 7 pages.
In the U.S. Patent and Trademark Office, Office Action in re: U.S. Appl. No. 12/672,865, dated Jan. 16, 2014, 23 pages.
In the U.S. Patent and Trademark Office, Applicant Initiated Interview Summary in re: U.S. Appl. No. 12/672,865, dated Nov. 28, 2012, 9 pages.
In the U.S. Patent and Trademark Office, Office Action in re: U.S. Appl. No. 13/314,472, dated Aug. 8, 2012, 16 pages.
In the U.S. Patent and Trademark Office, Requirement for Restriction/Election in re: U.S. Appl. No. 14/039,088, dated Feb. 24, 2014, 6 pages.
In the U.S. Patent and Trademark Office, Office Action in re: U.S. Appl. No. 14/035,531, dated Dec. 30, 2013, 6 pages.
Kawakami et al., "Bubble sheet used as impact buffer, heat insulating material, has multiple air bubbles formed on surface of base sheet arranged in mutually crossing fashion along longitudinal direction," Thomson Scientific, week 200145; vol. 2001, Nr:45.
"Materials & Processes: Resin matrices for composites," CW Composites World: Delivering the Global Composites Market, Mar. 25, 2016. Retrieved from the internet Feb. 13, 2021.
Bertoldi et al., "Wave propagation and instabilities in monolithic and periodically structured elastomeric materials undergoing large deformations," Physical Review B, 2008; 78: 184017.
International Search Report for related International Application No. PCT/US2011/056696, dated May 8, 2012.
International Search Report for related International Application PCT/US2009/053462, dated Oct. 19, 2009.
Kawakami et al., "Bubble sheet useed as impact buffer, heat insulating material, has multiple air bubbles formed on surface of base sheet arranged in mutually crossing fashion along longitudinal direction," Thomson Scientific, week 200145; vol. 2001, Nr: 45.
Leeman et al., "Varve formation and the climatic record in an Alpine proglacial lake: calibrating annually-laminated sediments against hydrological and meteorological data," The Holocene, 1994; 4:1, pp. 1-8.
Ling, "Supramolecular layer-by-layer assembly of 3D multicomponent nanostructures via multivalent molecular recognition," Apr. 2008, International Journal of Molecular Sciences, vol. 9, pp. 486-497.
Lvov, "Alternate assembly of ordered multilayers of SiO2 and other nanoparticles and polyions," 1997, Langmuir, vol. 13, pp. 6195-6203.
Mangalgiri, "Polymer-matrix composites for high-temperature applications," Defense Science Journal 55(2):175-193, Apr. 2005.
Shevchenko et al., "Structural characterization of self-assembled multifunctional binary nanoparticle superlattices," J. Am. Chem. Soc., 2006; 128: pp. 3620-3637.
Shipway, Nanoparticle arrays on surfaces for electronic, optical, and sensor applications, 2000, ChemPhysChem, vol. 1, pp. 18-52.
Sigalas et al., "Classical vibrational modes in phononic lattices: theory and experiment," Z. Kristallogr., 2005; 220: pp. 765-809.
U.S. Environmental Protection Agency, "Colorimetric screening procedure for RDX and HMX in soil," EPA Method 8510 [online], Revision 0, Feb. 2007 [retrieved on Jul. 24, 2012]. Retrieved from the Internet: URL: http://www.caslab.com/EPA-Methods/PDF/EPA-method-8510.pdf.

\* cited by examiner

GRADIENT NANOPARTICLE-CARBON ALLOTROPE-POLYMER COMPOSITE MATERIAL

RELATED APPLICATIONS

This application claims the benefit of U.S. patent application Ser. No. 13/880,270 ('270 Application and now U.S. Pat. No. 10,926,513) filed Apr. 18, 2013, and completed, for purposes of 35 U.S.C. § 371(c), on Jun. 25, 2013, wherein the '270 Application is a U.S. National Stage of PCT application PCT/US2011/056696 filed Oct. 18, 2011, the entirety of these applications which are incorporated by reference. This application also claims the benefit of U.S. Provisional Patent Application Ser. Nos. 61/394,066, filed Oct. 18, 2010, 61/411,494, filed Nov. 9, 2010, and 61/477,674, filed Apr. 21, 2011, the entirety of each of which is hereby incorporated herein by reference.

BACKGROUND OF THE INVENTION

1. Field of the Invention

The present invention relates to protective materials and, more specifically, to a material that diminishes the effect of a shock wave.

2. Description of the Related Art

Material designs for handling the impact of an external stimulus, such as a blast, as shock wave or projectiles, include, for example, woven fabrics, ceramic materials, and composite systems. Kevlar®, Zylon®, Armos®, Spectra® are commercially available fabrics made from high-strength fibers. Another material is ballistic steel, which is comprised of hardened high tensile steel, woven into fiber form. Further, boron carbide can be used as a material, for example, in the production of body armor.

Ceramic materials, in particular ceramic metal composites have found utility in light weight body armor.

Existing systems attempt to attenuate shock waves by presenting a high mass material between the source of the shock wave and the thing being protected. The high mass material absorbs some of the shock wave energy, thereby resulting in a shock wave of decreased amplitude. However, while the wave's amplitude may be decreased, it is only decreased by a certain amount and my still do considerable damage.

Therefore, there is a need for a material that disrupts a shock wave, thereby lessening its effect.

SUMMARY OF THE INVENTION

The disadvantages of the prior art are overcome by the present invention which, in one aspect, is a shock wave attenuating material that includes a substrate layer. A plurality of shock attenuating layers is disposed on the substrate layer. Each of the plurality of shock attenuating layers includes a gradient nanoparticle layer including a plurality of nanoparticles of different diameters that are arranged in a gradient from smallest diameter to largest diameter and a graphitic layer disposed adjacent to the gradient nanoparticle layer. The graphitic layer includes a plurality of carbon allotrope members suspended in a matrix.

In another aspect, the invention is a helmet that includes a helmet member configured to be worn by a user. A plurality of shock attenuating layers is applied to the helmet member. Each shock attenuating layer includes a gradient nanoparticle layer including a plurality of nanoparticles of different diameters that are arranged in a gradient from smallest diameter to largest diameter; and a graphitic layer disposed adjacent to the gradient nanoparticle layer, the graphitic layer including a plurality of carbon allotrope members suspended in a matrix.

In another aspect, the invention is an armor unit that includes a structural element, an armor plate and a plurality of shock attenuating layers. The plurality of shock attenuating layers is disposed in a predetermined relationship with at least one of the structural element and the armor plate. Each shock attenuating layer includes a gradient nanoparticle layer including a plurality of nanoparticles of different diameters that are arranged in a gradient from smallest diameter to largest diameter; and a graphitic layer disposed adjacent to the gradient nanoparticle layer, the graphitic layer including a plurality of carbon allotrope members suspended in a matrix.

In yet another aspect, the invention is a personal body armor unit that includes a ceramic plate, a high mass member and a nanoparticle shock wave attenuating material layer. The high mass member is disposed adjacent to the ceramic plate. The nanoparticle shock wave attenuating material layer is disposed on the high mass member.

The nanoparticle shock wave attenuating material layer can be disposed between the high mass member and the ceramic plate. Similarly, the nanoparticle shock wave attenuating material layer can be disposed outside of the high mass member or the ceramic plate or both. It is understood that any combination of these configurations fall within the scope of the invention.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
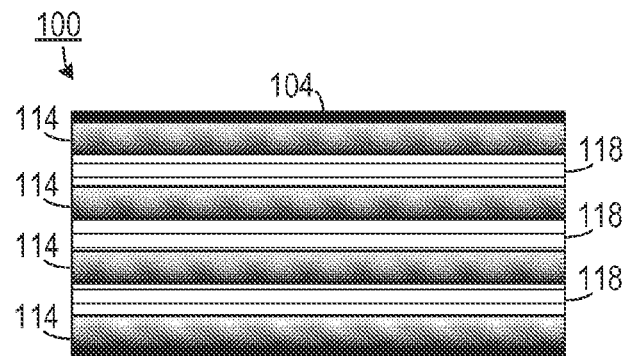
FIG. 1 is a schematic diagram of one embodiment of a shock wave attenuating material.

A preferred embodiment of the invention is now described in detail.

Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 12/672,865 (U.S. Patent Publication 2011/0212320) discloses a gradient nanoparticle composite material and a method of making a gradient nanoparticle composite material and is hereby incorporated by reference.

As shown in FIG. 1, one embodiment of a shock wave attenuating material 100 includes a substrate layer 104 and a plurality 110 of shock attenuating layers disposed on the substrate layer. Each of the plurality 110 of shock attenuating layers includes a gradient nanoparticle layer 114 and a graphitic layer 118 disposed adjacent to the gradient nanoparticle layer 114. In a typical embodiment, the shock wave attenuating material 100 would include at least 10 gradient nanoparticle layers 114 alternating with at least 10 graphitic layers 118 (while only three are shown in FIG. 1 for the sake of simplicity).

Figure 2A:
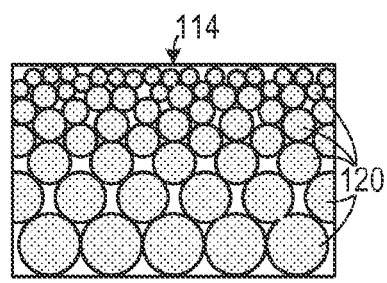
FIG. 2A is a schematic diagram of one embodiment of a gradient nanoparticle layer.

As shown in FIG. 2A, each nanoparticle layer 114 includes a plurality of nanoparticles 120 of different diameters (at least two different diameters) that are arranged in a gradient from smallest diameter to largest diameter. The specific orientation of the gradient (smallest to largest vs. largest to smallest) depends on the specific application for which the material is being used.

Figure 2B:
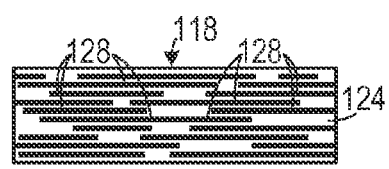
FIG. 2B is a schematic diagram of one embodiment of a graphitic layer.

As shown in FIG. 2B, the graphitic layer 118 includes a plurality of carbon allotrope members 128 suspended in a matrix 124. The carbon allotrope members 128 can include graphene sheets, carbon nanotubes, fullerenes, functionalized graphene sheets, functionalized carbon nanotubes, and functionalized fullerenes.

Depending upon any transparency requirement, the nature of the substrate may be varied. Two potential substrates are polycarbonate and carbon fiber composites/laminates. In fact, a thicker (yet still transparent) polymer-graphene composite layer may be employed directly as the substrate. The gradient structure may be any of those shown, for example, in U.S. Patent Publication US-2011-0212320-A1, which is incorporated herein by reference, as well as others built up from the same principles. One embodiment of a gradient structure has a total thicknesses of the order of 5-10.pm which can then be repeated as many times as required.

A fullerene layer may be directly deposited by coating, from a toluene solution, onto the gradient structure in thicknesses as small as a monolayer. Similarly, nanotubes and graphene or graphene oxide sheets may be coated from suspensions in organic solvents such as chloroform. However, these two allotropes may also be (preferentially) deposited as polymer composites. The use of a polymer composite provides additional structural integrity to the overall coating and, more importantly, provides additional impact regions for the generation of partially reflected shock waves and will further reduce the overall passage of the shock energy from the impact site to the protection site. Carbon allotrope members 128 can be functionalized as a graphene oxide. Similarly, nanotubes and fullerenes can be functionalized with carboxylic acid, amines, can be hydroxylated or carboxylated.

Figure 3:
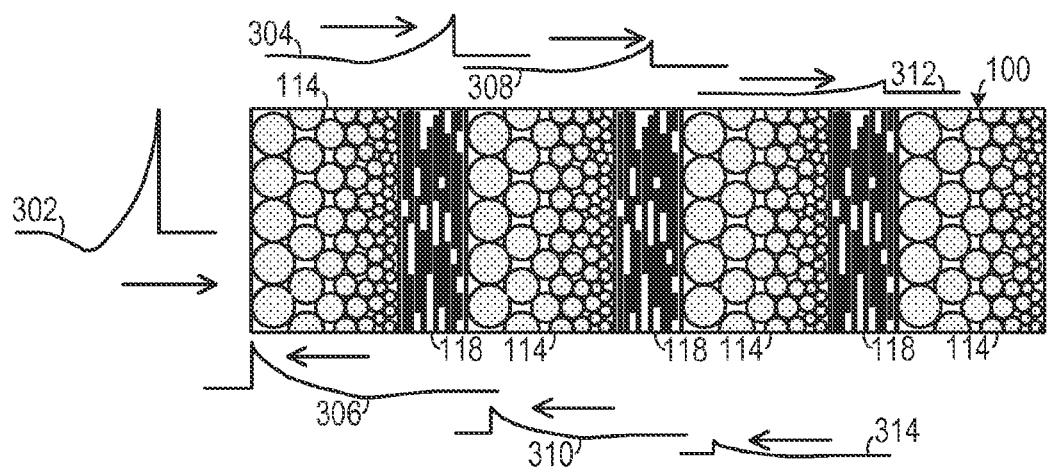
FIG. 3 is a schematic diagram of the embodiment shown in FIG. 1, demonstrating shock wave attenuation.

As shown in FIG. 3, the graphitic layers 118 are of a thickness that is sufficient to reflect at least a portion of a shock wave impinging thereon. The thickness of the graphitic layers 118 will depend on the type of shock wave that the designer desires to protect against. When a shock wave 302 impinges on the material 100, the first gradient nanoparticle layer 114 begins to attenuate the shock wave 304 and the first graphitic layer 118 reflects a portion of the shock wave 306, thereby generating destructive interference with any residual shock wave energy. Successive waves 308 and 312 reflect in a similar fashion to generate reflected waves 310 and 314, which further interfere with residual shock energy.

The carbon or carbon composite layers mark the end of one nanostructure and the start of the next. A significant reduction of the incident shock wave occurs after passage through less than 10 μm of gradient nanoparticles. Stacks or layers of such structures with the carbon and/or carbon composites are interspersed and define the layer or stack limit. The effect, at each carbon interface, will be to create a backward traveling wave causing attenuation of the incident shock wave, as well as a much reduced forward transmitted shock wave, which passes in to the next layer of the structure. A stack of 50 alternating gradient nanoparticle structures (each composed of 30 nanoparticle layers) and composite layers would result in a 1 mm thick coating and significant attenuation of the incident shock wave. Each of these 50 gradient or composite layers is one-fifth the thickness of the typical human hair.

Figure 4:
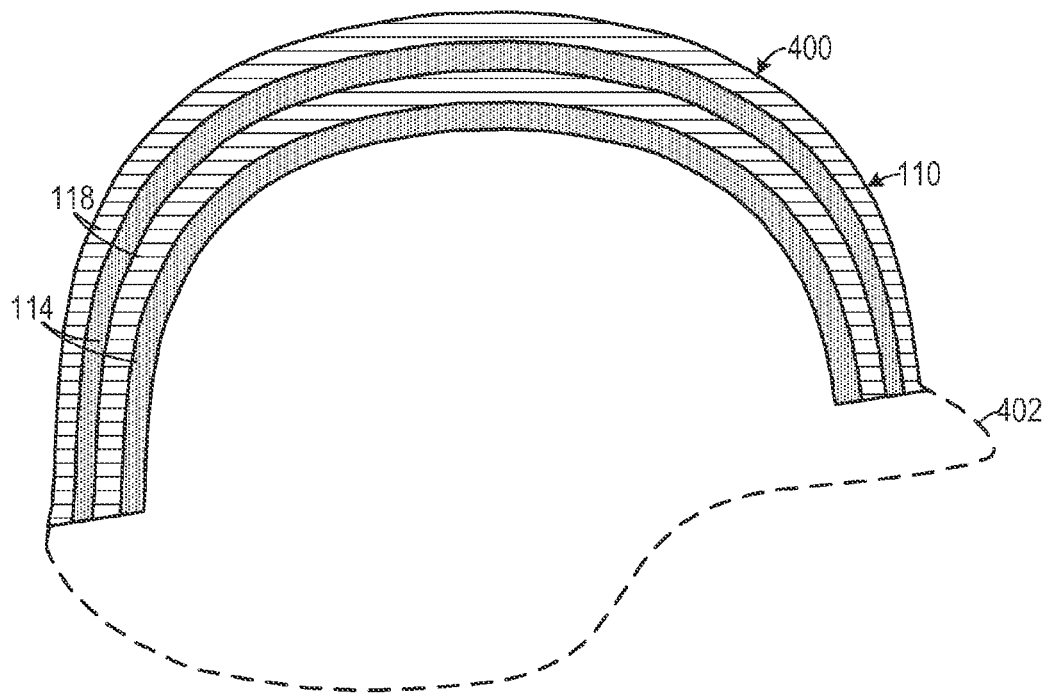
FIG. 4 is a schematic diagram of one embodiment of a helmet.

As shown in FIG. 4, the shock wave attenuating material 110 can be part of a helmet 400 or helmet liner. In one embodiment, a helmet 400 includes a helmet member 402 configured to be worn by a user, such as an Enhanced Combat Helmet [ECH] used in military applications. The helmet member 402 could be made from a para-aramid synthetic fiber composite, such as Kevlar®. In other embodiments, the helmet could be of the type used in sports. For example, the shock wave attenuating material 110 could be used in a baseball helmet, a football helmet, a hockey helmet, a bicycling helmet, or the like. The helmet 400 could include an outer shell (such as, e.g., acrylonitrile butadiene styrene), a shock wave attenuating material 110 layer and an inner shell. The helmet 400 could even include an outer shell and several layers of shock wave attenuating material 110 alternating with high mass material layers. The high mass material could include, for example, a high density plastic, a composite, fiber glass, a para-aramid synthetic fiber composite, a vinyl, acrylonitrile butadiene styrene, an acrylic, a metal, or any other material typically used in a helmet. A shock-absorbing foam liner may also be added to the helmet.

Figure 5:
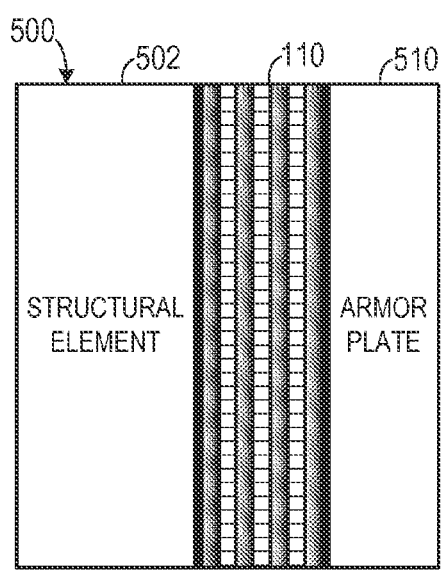
FIG. 5 is a schematic diagram of one embodiment of an armor unit.

As shown in FIG. 5, the shock wave attenuating material 110 can be part of a an armor unit 500, which can include a structural element 502, such as a vehicle panel. An outer armor plate 510, such as a ceramic or composite plate, provides an outer armor surface. The shock wave attenuating material 110 is disposed between the structural element 502 and the armor plate 510. The shock wave attenuating material 110 could also be outside of either the structural element 502 or the armor plate 510 or both. It will be appreciated that any combination of these configurations will fall within the scope of the invention.

Figure 6:
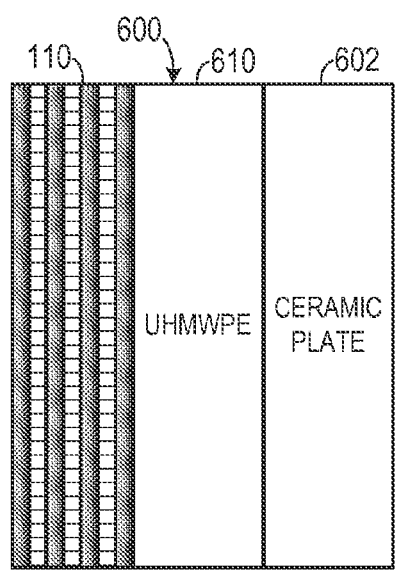
FIG. 6 is a schematic diagram of one embodiment of a body armor unit.
Figure 7:
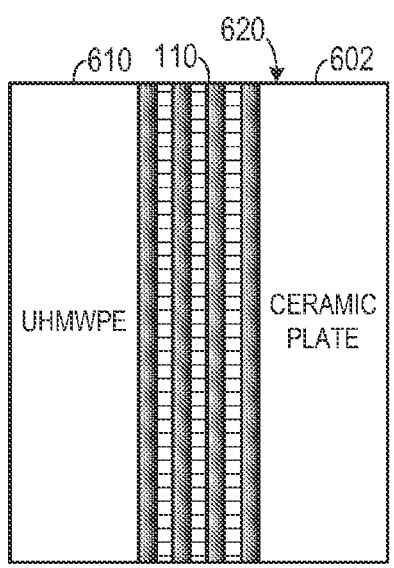
FIG. 7 is a schematic diagram of one embodiment of a body armor unit.
Figure 8:
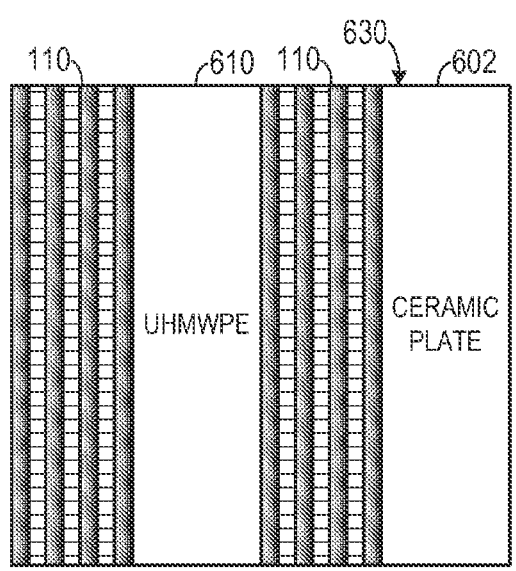
FIG. 8 is a schematic diagram of one embodiment of a body armor unit.

As shown in FIG. 6, one embodiment of a body armor assemblage 600, such as an interceptor body armor assemblage (of the type used in the Improved Outer Tactical Vest, Improved Modular Tactical Vest and the US Army and USMC plate carriers). Such an assemblage 600 would include an armor plate 602 (such as a ceramic plate) with a high mass member. Examples of materials suitable for use in the high mass member include: a high density polymer 610 (such as an ultra high molecular weight polyethylene), a para-aramid synthetic fiber composite, a carbon fiber composite, a metal, a ceramic and combinations thereof. The shock wave attenuating material 110 can be applied to the high density polymer 610 on the high density polymer 610 opposite from the armor plate 602 on the side adjacent to the body of the user. This latter application helps solve the problem of backface deformation. As shown in FIG. 7, in one embodiment of a personal body armor assemblage 620, the shock wave attenuating material 110 is disposed between the high density polymer 610 and the armor plate 602. As shown in FIG. 8, multiple layers of shock wave attenuating material 110 may be applied to the armor assemblage 630.

In one application, the shock wave attenuating material 110 can be applied to such devices as soccer shin guards, baseball catchers' chest pads, football shoulder pads, baseball mitts and the like. In can also be applied to such devices as golf clubs and baseball bats to reduce the effects of shock associated with their use.

In some embodiments, the gradient nanoparticle composite material is capable of absorbing an impact of a shock wave that, for example, is produced by an explosion or caused during operation of a device. In some embodiments, the gradient nanoparticle composite material is capable of mitigating and/or remediating one or more secondary blast effects resulting from the explosion.

In some embodiments, the gradient nanoparticle composite material is capable of reacting to and/or interacting with one or more stimuli existing in a blast zone environment. For example, in some embodiments the material can absorb at least a portion of an initial blast impact and/or the over pressure wave resulting from an explosion. In addition, or alternatively, gradient nanoparticle composite material can be designed to mitigate and/or remediate one or more related blast effects resulting from the blast impact itself. Thus, some embodiments can provide a composite material that through intelligent design of the system can not only reduce blast impact with greater efficiency and efficacy, but that can also mitigate and/or remediate one or more secondary blast effects.

In some embodiments, the gradient nanoparticle composite material can provide bomb blast mitigation and/or remediation by reducing the reflective value of the bomb blast by absorption of the bomb blast energy. In some embodiments, the primary mitigating and/or remediating process can be by absorption of the bomb blast shock wave. In some embodiments, the mitigating and/or remediating process can be by absorption of the pre-over pressure wave that precedes the shock wave. Absorption of the shock wave and/or the pre-over pressure wave can occur through one or more mechanisms, including, for example, momentum transfer, destruction of the spatial symmetry of, e.g., the blast wave, plastic deformation, rupture of particles, e.g. filled and unfilled core-shell particles, restitution, and interparticle/interlayer shear.

In some embodiments, the gradient nanoparticle composite material can provide a platform from which a wide variety of blast effects can be mitigated and/or remediated. For example, in a filled-shell material the absorbed energy can be utilized to rupture, e.g., microcapsules to introduce a series or selection of materials or material systems into the blast environment and to thus mitigate and/or remediate the blast effects. In some embodiments, the gradient nanoparticle composite material can provide a relatively light weight material that can be applied to preexisting structures or systems with no deleterious effects on the performance attributes of the pre-existing structure or system.

Some embodiments provide bomb proofing, impact or smart material applications. Examples of bomb proof applications include receptacles and liners (such as in waste receptacles and bags etc.), satellites, helicopters, and high tech devices (computer/hardware casings, cable protection), construction (buildings and their facades), bridges and their structural members, pipes and pipelines (for fossil fuels, conduits, utilities), automotive (door panels, bumpers, dashboards, windshields and windows, undercarriages and roofs), aerospace (interior/exterior of planes), etc. In some embodiments, the gradient nanoparticle composite material can be used in connection with military equipment, structures, vehicles, vessels and crafts for land, sea, and airborne forces to include armored and unarmored vehicles, aircraft, (which includes helicopters and unmanned drones), and nautical vessels such as submarines, ships, boats and the like.

For military and civilian uses, the gradient nanoparticle composite material can be applied as an exterior coating, film, intermediate layer and/or as a panel to pre-existing equipment or, alternatively, can be utilized for forming structural components of the military vehicle, aircraft, or nautical vessel.

The application of gradient nanostructured composites for the attenuation of shock waves is based on the same principles that apply macroscopic granular spheres to create blast walls. Granular materials, especially arranged in a gradient, create mismatching of the solitary wave at each particle contact point and, hence, attenuation of that wave. The effect is a combination of passive and active physical processes: absorption, distortion, and engineered redirection of the shock wave without appreciable heating. In effect, the composite causes destructive interference of the shock wave to attenuate the incident wave. The composite, an ordered structure including selected solid, hollow and filled nanoparticles, may be coated onto a surface (e.g., a protective device, such as a helmet) and may also be produced as a self-supported liner (using plastic containment). Additionally, while the gradient array provides shock attenuation, the material within the filled nanoparticles acts to create an indicator that the user has experienced a shock wave sufficient to cause mild or severe traumatic brain injury while wearing the protective device, such as a helmet. The final product is a lightweight coating that does not change the flexibility of the treated material and which can be made transparent by careful choice of nanoparticle materials. After activation, the protective device may be recoated, if that technology was used in production, or the liner may be replaced, if that approach was employed.

One-dimensional models of a shock wave propagating through a homogeneous or a tapered granular chain demonstrate shock wave attenuation. While three-dimensional structures are too complex for existing modeling systems, the major properties observed for one dimensional calculations are valid in the three-dimensional case. Assuming no elastic effects and no loading, the spheres are simply touching at a single point of contact, the kinetic energy loss is calculated as a function of the change in sphere radius, q, as a wave travels through the spheres, the energy lost per collision in the spheres, EL, and the number of spheres, N, in the chain:

$$\frac{KE_{OUT}}{KE_{IN}} = \left\{ \frac{[2(1-q)^3 - E_L]^2}{(1-q)^3[1 + (1-q)^3]^2} \right\}^{N-1} \quad (1)$$

The values of q and N are fixed by the experiment; the loss term is defined by the ratio of the loading force as two particles come together under the influence of a wave and the unloading forces, as they separate. The decrease in kinetic energy predicted by Equation (1), $KE_{OUT}/KE_{IN}$, is independent of the size of the spheres. The decrease in kinetic energy occurs because each particle absorbs some of the incident energy and that energy remains with the particle. Note that for small values of N, a chain of constant size (q=0) exhibits little loss of kinetic energy. For values of q of the order of 10% and elastic losses of approximately 5%, as much as 80% of the input energy may be absorbed in a chain of 20 spheres. Experimental evidence confirms the theoretical prediction. The large number of nanoparticles in a typical coating provides a large number of the particle to particle contact points required by Equation (1) and also serves to dissipate the kinetic energy surrendered by the incident shock wave without appreciable heating of the coating.

Experimental evidence and theory indicate that the concept and its shock attenuation benefit are independent of particle size. That fact opens the door to using the principles to design nanostructures with a tapered chain-like structure. Such a structure is inherently three-dimensional and beyond the current theoretical models. However, careful consideration indicates that it is best described as a gradient array of nanoparticles; a structure tapered in multiple directions and offering increased attenuation of incoming shock waves. The structure could be built from monolayers of nanoparticles deposited on a substrate beginning with the smallest radius and growing larger with a q of approximately 10%, the monolayer gradient could be reversed, either gradient could be repeated in order or alternating gradients that reverse the order of the nanoparticle layers could be constructed or multiple layers of each particle size could be used to construct the gradient. Moreover, chemically modified nanoparticles present the opportunity to add functionality to the nanostructure. The nanospheres may be solid and made of any number of polymers, metals, ceramics or other materials, so that the elastic properties and the interparticle forces may be varied. Hollow nanoparticles offer an interesting capability to insert voids, spheres shattered under compression by the shock wave, which would only act when the particles are compressed by sufficient force. Polymer nanoparticle shells may be constructed to carry other materials within the nanoparticle, providing the means to include in the structure indicators of the passage of a blast wave or the ability to release a beneficial agent to the users upon activation by the blast wave. The final product is a lightweight coating that does not change the flexibility of the treated material and can be made transparent by careful choice of nanoparticle materials. Taken as a whole, these characteristics of nanostructured gradient arrays provide a menu for the development of blast wave protection with targeted applications.

One version involves a structure that incorporates carbon allotrope (fullerene, nanotubes or graphene) and/or carbon allotrope-polymer composite layers into the overall structure. The carbon allotropes provide increased strength to the nanostructure since these materials rank among the strongest known. One embodiment employs "stacks" or "layers" of such structures with the carbon and/or carbon composites interspersed and defining the layer or stack limit. The effect, at each carbon interface, is to create a backward traveling wave causing attenuation of the incident shock wave, as well as a greatly reduced forward transmitted shock wave, which passes in to the next layer of the structure. A stack of 50 gradient nanoparticle structures (each composed of 30 nanoparticle layers) and composite layers would result in a 1 mm thick coating and significant attenuation of the incident shock wave. This structure would have a thickness of approximately 100 µm or 10 human hairs.

In one experimental embodiment, samples were made using a spin coating technique and measuring approximately 6 cm2. Samples having a wide variety of gradients and employed solid polymer, solid silica, hollow polymer and filled (with long-chain hydrocarbons, as prototypes) silica nanoparticles were employed. Mono-dispersed coatings, tapered gradients (large to small and small to large) and repetitive gradients using polycarbonate substrates treated with UV light to make the surface polar were also used. Most samples employed a hexagonal close packed of the nanoparticles. The coatings typically had a tapered gradient of 320 nm/260 nm/220 nm/160 nm/130 nm. A laboratory-built impact tester was used to explore the effects of the nanostructures on the shock wave caused by the impact of a falling mass. The maximum in the impact shock wave was reduced in magnitude and delayed relative to initiation of the event. The reduced force was also spread over a greater temporal region to minimize the net effect. A list of some of our results is contained in the table below, along with brief descriptions of the nanosphere gradients.

The following table shows experimental impact shock results for polystyrene or silica nanospheres between two treated polycarbonate plates. The nanoparticles were solid spheres, except the 400 nm size, which were hollow:

| Sample | Max. Force, N | Width, ms | Delay, ms | Comments |
| --- | --- | --- | --- | --- |
| Bare sensor | 1334 | 0.16 | — | Control-no sample at all |
| Polycarbonate × 2 | 1156 | 0.27 | 0.10 | Control-two polycarbonate substrates |
| #1 | 872 | 0.31 | 0.18 | 130-160-220-260: 8 repeats/4 layers |
| #3 | 783 | 0.30 | 0.21 | 130-160-220-250-220-160: 5 repeats/6 layers |
| #5 | 623 | 0.34 | 0.22 | 130-160-220-260-320-400-320-260-220-160: 3 repeats/10 layers |
| #7 | 712 | 0.31 | 0.20 | 150-130-150 (silica): 30 repeats/1 layer |
| #8 | 578 | 0.34 | 0.24 | 320-400: 13 repeats/2 layers |
| #10 | 712 | 0.30 | 0.21 | 400-320-260-220-160-130: 4 repeats/6 layers |

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

The invention claimed is:

1. A composition comprising:
   a plurality of layers, each one of the plurality of layers including:
   (i) a gradient nanoparticle layer comprising a plurality of nanoparticles of at least two different diameters that are arranged in a gradient based on nanoparticle diameter; and
   (ii) a carbon allotrope layer disposed adjacent to the gradient nanoparticle layer, the carbon allotrope layer comprising carbon allotrope members suspended in a matrix;
   wherein the carbon allotrope layer of at least one of the plurality of layers is a non-transparent carbon allotrope layer.

2. The composition of claim 1, wherein the nanoparticles within at least one gradient nanoparticle layer are unrestrained.

3. The composition of claim 1, wherein the gradient nanoparticle layer excludes carbon nanotubes.

4. The composition of claim 1, wherein the nanoparticles comprise at least one of polymers, ceramics and metals.

5. The composition of claim 1, wherein the nanoparticles include at least one of solid nanoparticles, hollow nanoparticles, core-shell and filled core-shell nanoparticles.

6. The composition of claim 5, wherein the filled core-shell nanoparticles include an indicator for showing that a user has experienced a blast or shock wave sufficient to cause traumatic brain injury.

7. The composition of claim 1, wherein the carbon allotrope members are selected from the group consisting of graphene sheets, functionalized carbon nanotubes, functionalized graphene sheets and functionalized fullerenes.

8. The composition of claim 1, wherein the carbon allotrope members are carbon nanotubes.

9. The composition of claim 1, wherein the carbon allotrope members comprise carbon allotrope-polymer composites.

10. The composition of claim 1, further comprising a substrate.

11. The composition of claim 10, wherein the substrate layer comprises polycarbonate or carbon fiber composites/laminates.

12. The composition of claim 1, wherein the gradient nanoparticle layer has a thickness between 5 to 20 micrometers.

13. The composition of claim 1, wherein the plurality of nanoparticles comprises polystyrene.

14. The composition of claim 1, wherein the plurality of nanoparticles comprises silica.

15. The composition of claim 1, disposed in a helmet.

16. The composition of claim 1, disposed in a portion of an armor unit, wherein the armor unit further comprises a structural element and an armor plate.

17. The composition of claim 1, disposed in a portion of a personal body armor unit comprising a ceramic plate, a high mass member disposed adjacent to the ceramic plate, and the plurality of layers disposed on the high mass member.

18. The composition of claim 1, disposed on a computer or hardware casing.

19. The composition of claim 1, disposed as an exterior coating, film, intermediate layer or panel to pre-existing equipment.

20. The composition of claim 1, disposed in a structural component of an aircraft, a nautical vessel or a vehicle panel.

* * * * *